United States Patent
Bourghelle et al.

(10) Patent No.: US 6,173,101 B1
(45) Date of Patent: Jan. 9, 2001

(54) FIBER OPTIC CABLE

(75) Inventors: Patrick Bourghelle, Saint Denis; Pierre Gaillard, Puteaux, both of (FR)

(73) Assignee: Alcatel, Paris (FR)

( * ) Notice: Under 35 U.S.C. 154(b), the term of this patent shall be extended for 0 days.

(21) Appl. No.: 09/012,185

(22) Filed: Jan. 23, 1998

(30) Foreign Application Priority Data

Jan. 27, 1997 (FR) .................................................. 97 00826

(51) Int. Cl.$^7$ .................................................. G02B 6/06
(52) U.S. Cl. ............................ 385/114; 385/115; 385/121
(58) Field of Search .................. 385/114, 121, 385/115

(56) References Cited

U.S. PATENT DOCUMENTS

| | | | |
|---|---|---|---|
| 3,240,106 | * | 3/1966 | Hicks .................................. 385/121 |
| 3,365,699 | * | 1/1968 | Foster .................................. 385/121 |
| 3,609,216 | | 9/1971 | Copp . |
| 4,332,439 | * | 6/1982 | Lübbers et al. ...................... 385/121 |
| 4,412,721 | * | 11/1983 | Saatze ................................. 385/121 |
| 4,534,615 | * | 8/1985 | Iwasaki .............................. 385/121 |
| 4,597,030 | * | 6/1986 | Brody et al. ....................... 385/114 |
| 4,730,895 | * | 3/1988 | Siedband et al. .................... 385/121 |
| 4,820,010 | * | 4/1989 | Scifres et al. ....................... 385/121 |
| 4,866,842 | | 9/1989 | Gorjat . |
| 5,132,530 | * | 7/1992 | Groh et al. ......................... 385/121 |
| 5,212,756 | * | 5/1993 | Eoll ................................... 385/114 |
| 5,796,907 | * | 8/1998 | Shiba et al. ........................ 385/121 |

FOREIGN PATENT DOCUMENTS

| | | |
|---|---|---|
| 2427150A1 | 1/1976 | (DE) . |
| 0642138A1 | 3/1995 | (EP) . |
| 0734030A1 | 9/1996 | (EP) . |

* cited by examiner

*Primary Examiner*—James W. Davie
(74) *Attorney, Agent, or Firm*—Sughrue, Mion, Zinn, Macpeak & Seas, PLLC

(57) ABSTRACT

A fiber optic cable includes an end section in the form of a ribbon and a central section in which the sheath has a substantially tubular form. Applications include fiber optic cable connectors and spare lengths of fiber optic cable for jointing cassettes.

5 Claims, 2 Drawing Sheets

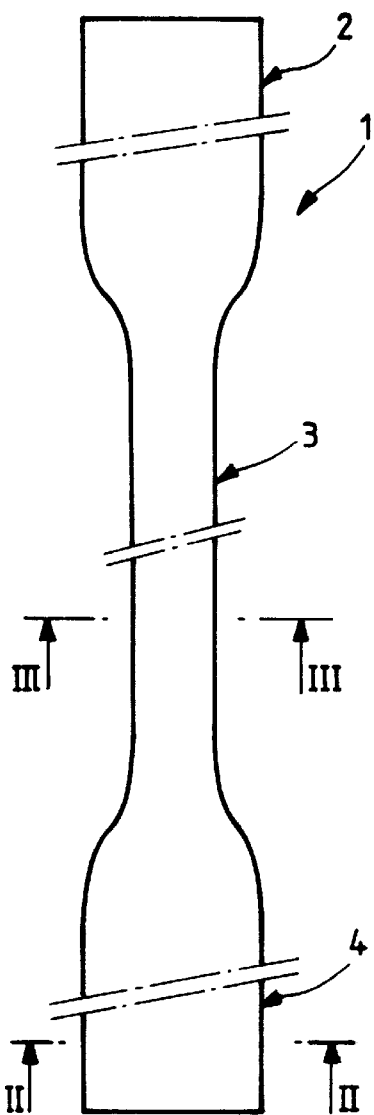
FIG_1
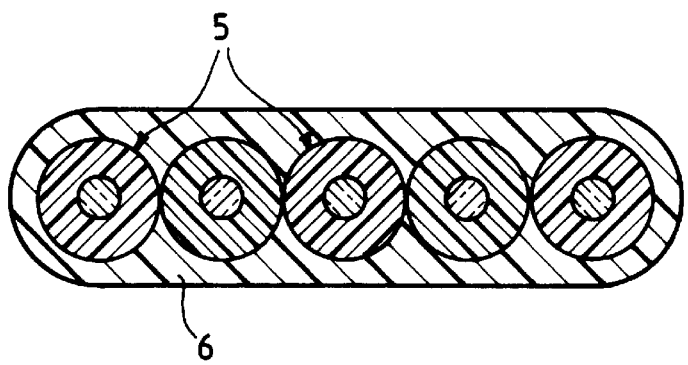
FIG_2
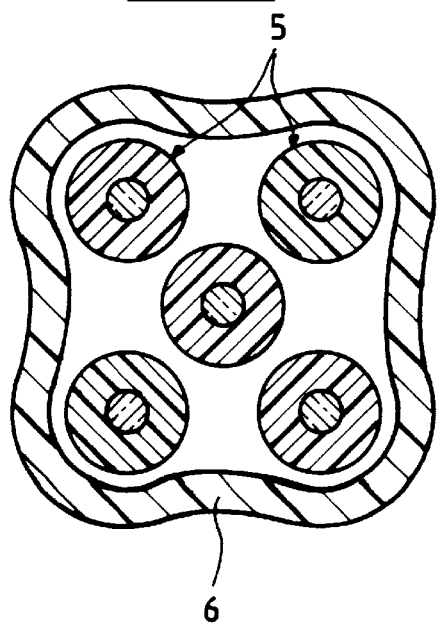
FIG_3

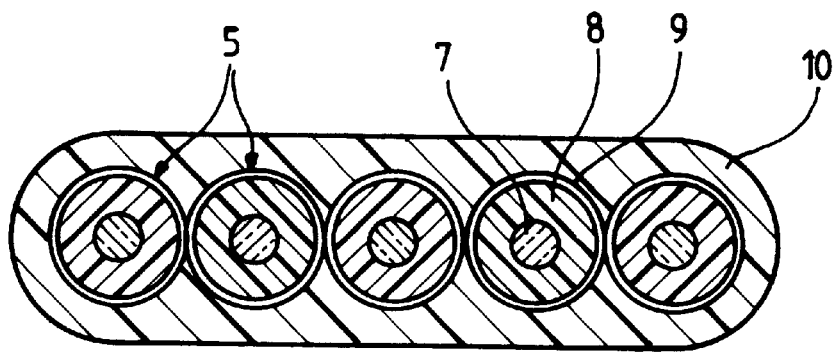
FIG_4
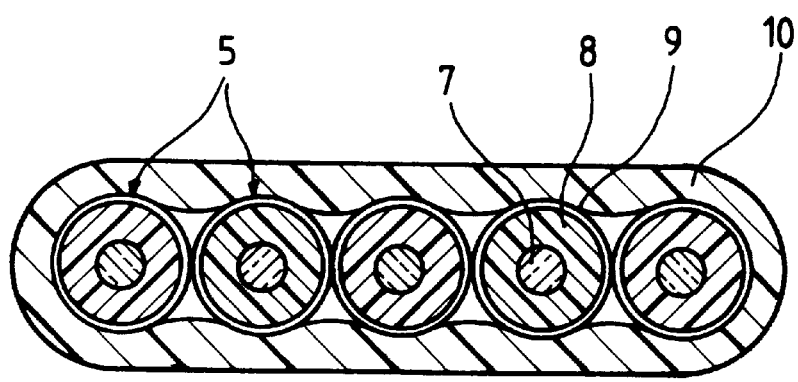
FIG_5
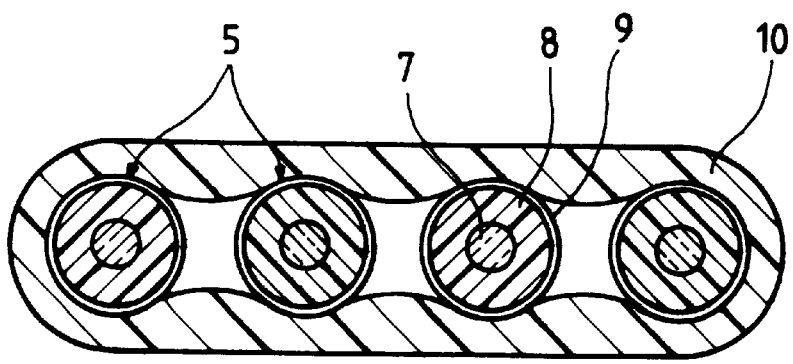
FIG_6

FIBER OPTIC CABLE

BACKGROUND OF THE INVENTION

1. Field of the Invention

The present invention concerns a fiber optic cable. Its applications include, but are not exclusive to, the field of fiber optic cable jointing boxes, also known as splice organizers.

2. Description of the Prior Art

Jointing boxes generally include a pluralility of substantially rectangular cassettes that can be stowed side by side in racks or stacked in the form of drawers. The cassettes accommodate fiber optic cable connectors and spare lengths of fiber optic cable, these spare lengths being provided to enable subsequent resplicing operations.

Ribbon or flat cable type fiber optic cables in which the optical fibers are disposed parallel to each other and are embedded in an extruded insulative sheath forming a ribbon are known in themselves. It is advantageous to use a flat cable of this kind in a jointing cassette because mass jointing is simpler than jointing independent fibers.

The inventors have found that coiling a flat cable in a jointing cassette leads to curvature problems, the radius of curvature being limited by the stiffness of the flat cable, the effect of which is to cause difficulties in passing the flat cable into certain parts of the cassette and a problem caused by a spring effect of the flat cable which tends naturally to open out when it is coiled up on itself.

An aim of the present invention is to overcome the drawbacks of the prior art.

SUMMARY OF THE INVENTION

To this end, the invention consists in a fiber optic cable including a plurality of optical fibers and a protective sheath, said cable having an end section in the form of a ribbon and a central section wherein said protective sheath is of substantially tubular form.

This structure enables easy connection by virtue of the end section in ribbon form whilst avoiding the spring effect observed with ribbons coiled up on themselves.

The advantage of the structure of the invention over prior art ribbons increases in proportion to the number of optical fibers in the ribbon. The width of the ribbon being proportional to the number of optical fibers, the ribbons used in the prior art can fairly rapidly spill out of the coiling cassette. In contrast to this, the diameter of the tubular sheath of the invention does not increase in proportion to the number of optical fibers. Moreover, the greater the number of optical fibers constituting the ribbon, the greater the preferential inertia of the ribbon, in other words the ribbon has a single axis of curvature; this can constitute an obstacle to placing the ribbon in the splicing boxes. This drawback disappears with the structure of the invention.

In one particular embodiment each end section of the cable is in the form of a ribbon.

The cable preferably includes at least three optical fibers. Each optical fiber preferably has a primary protection cladding and a non-stick layer. The non-stick layer facilitates deformation of the cable to obtain a tubular section from a ribbon section.

The optical fibers are advantageously mechanically free relative to the sheath in the part of the cable where the sheath is of tubular form. In this case, the principal function of the sheath is to prevent the optical fibers spilling out of their coiling path.

The invention also consists in a method of fabricating a fiber optic cable in accordance with the invention which consists in choosing a fiber optic ribbon and modifying the shape of the insulative sheath by thermal and/or mechanical stressing.

In particular, the stressing can include a heating step to flexibilize the insulative sheath and a step in which mechanical pressure is applied to each edge of the ribbon to impart a substantially tubular shape to the sheath.

The features and advantages of the invention will emerge more clearly from the following description of embodiments of the invention given by way of non-limiting illustrative example with reference to the accompanying drawings.

BRIEF DESCRIPTION OF THE DRAWINGS

FIG. 1 is a front view of a cable of the invention.

FIGS. 2 and 3 are cross-sections of the cable from FIG. 1 taken along the lines II—II and III—III.

FIGS. 4 through 6 show embodiments of the ribbon in cross-section.

DETAILED DESCRIPTION OF THE PREFERRED EMBODIMENTS

FIG. 1 is a front view of a cable in accordance with the invention. This cable 1 has a first end section 2, a central section 3 and a second end section 4. By central section is meant a section that has no ends; a central section is therefore not necessarily situated in the middle of the length of cable, in other words at equal distances from both ends of the cable.

In the embodiment shown each end section is in the form of a ribbon or flat cable. As can be seen in FIG. 2, the optical fibers 5, of which there are five in the examples shown, are parallel to each other and are mechanically retained in a particular relative position by an insulative sheath 6 that also provides mechanical protection.

The central section of the cable has a different shape, the insulative sheath 6 here having a substantially tubular shape. By substantially tubular shape is meant that the insulative sheath defines a volume in which the optical fibers 5 are mechanically relatively free relative to the insulative sheath. The term tubular must not be interpreted in the geometrical sense of an annular shape with a circular base, but more generally in the sense of any annular shape, preferably more or less circular or oval.

The cable of the invention has the advantage that it is easy to joint, the ends being in the form of a ribbon, whilst being easily accommodated and coiled in the jointing cassette by virtue of its flexible tubular central part, which imposes less mechanical stresses on the optical fibers and avoids the spring effect encountered with ribbons.

Also, access to the optical fibers is easier because, in the tubular part, the insulative sheath can be opened more easily than if the cable as a whole were in the form of a ribbon.

In the cable shown in FIG. 1 the two end sections 2, 4 are in the form of a ribbon. However, the invention also encompasses a cable in which only one end is in the form of a ribbon, the other end having any form and in particular possibly having a tubular form similar to that of the central section. A structure of this kind is of benefit when the optical fibers of the cable are intended to be jointed independently of each other at this tubular form end.

The invention applies to all cables regardless of their length. In the case of a cable intended for a jointing box, the length of the cable is generally in the order of 1 meter to 2 meters. The respective lengths of the end sections and the central sections obviously depend on the intended use.

The cable of the invention can easily be obtained from a fiber optic ribbon by deforming the sheath where the cable is required to adopt a substantially tubular form. This deformation can be produced by moderate heating of the sheath and/or by mechanical deformation, for example by clamping the edges of the ribbon, by ovalisation, by twisting, by rolling and more generally by any manipulation of the ribbon detaching the optical fibers from the sheath without damaging the optical fibers or the sheath.

In the case of deformation by heating the temperature and the duration of heating obviously depend on the material of the sheath, which can be an epoxy acrylic resin that can be polymerized by exposure to UV light, nylon® or PVC.

Fiber optic ribbons that can easily be deformed by the method of the invention are shown in cross-section in FIGS. 4 through 6.

These ribbon comprise a plurality of optical fibers 5 each of which consists of a 125 μm diameter glass fiber 7, a 60 μm thick protective cladding 8 and a 10 μm thick non-stick layer 9. These optical fibers are held in the same plane and at a particular distance from each other by an insulative sheath 10 approximately 40 μm thick. The materials used to form the fiber optic ribbons shown are those conventionally used by the skilled person.

As can be seen in the figures, the optical fibers can be entirely embedded in the insulative sheath (see FIG. 4) or merely held in place by top and bottom layers of insulation (see FIGS. 5 and 6), and the optical fibers can be in contact with each other (see FIGS. 4 and 5) or separate (see FIG. 6).

The purpose of the non-stick layer 9 is to facilitate stripping the optical fibers. This non-stick layer can of course be omitted if the materials used for the protective cladding 8 and the insulative sheath 10 are not strongly adherent to each other.

The invention is not limited to the embodiments shown but to the contrary encompasses means equivalent to those described and all embodiments in accordance with the accompanying claims.

What is claimed is:

1. A fiber optic cable including a plurality of optical fibers and a protective sheath, said cable having an end section in the form of a ribbon and a central section wherein said protective sheath is of substantially tubular form, and wherein each optical fiber has a protective cladding and a non-stick layer.

2. The fiber optic cable claimed in claim 1 wherein each end section is in the form of a ribbon.

3. The fiber optic cable claimed in claim 1 including at least three optical fibers.

4. The fiber optic cable claimed in claim 1 wherein said optical fibers are mechanically free relative to said protective sheath in that part of said cable wherein said sheath is of substantially tubular form.

5. A fiber optic cable including a plurality of optical fibers and a protective sheath, said cable having end sections each in the form of a ribbon and a central section wherein said protective sheath is of substantially tubular form.

* * * * *